United States Patent
Fuhrmann

(10) Patent No.: US 10,448,310 B2
(45) Date of Patent: Oct. 15, 2019

(54) METHOD OF MAPPING OPTIMAL COMMUNICATION ROUTES THROUGH A MESH NETWORK

(71) Applicant: GOOEE LIMITED, St Albans (GB)

(72) Inventor: Amir Fuhrmann, Los Altos, CA (US)

(73) Assignee: Gooee Limited, St. Albans (GB)

( * ) Notice: Subject to any disclaimer, the term of this patent is extended or adjusted under 35 U.S.C. 154(b) by 72 days.

(21) Appl. No.: 15/648,449

(22) Filed: Jul. 12, 2017

(65) Prior Publication Data

US 2017/0311226 A1    Oct. 26, 2017

Related U.S. Application Data

(63) Continuation-in-part of application No. 15/231,358, filed on Aug. 8, 2016, now abandoned.

(60) Provisional application No. 62/361,388, filed on Jul. 12, 2016, provisional application No. 62/201,764, filed on Aug. 6, 2015.

(51) Int. Cl.
| | |
|---|---|
| *H04W 40/24* | (2009.01) |
| *H04W 40/30* | (2009.01) |
| *H04L 12/751* | (2013.01) |
| *H04L 12/753* | (2013.01) |
| *H04W 84/18* | (2009.01) |
| *H04L 12/26* | (2006.01) |
| *H04L 12/24* | (2006.01) |
| *H04W 4/80* | (2018.01) |

(52) U.S. Cl.
CPC .......... *H04W 40/246* (2013.01); *H04L 45/02* (2013.01); *H04L 45/48* (2013.01); *H04W 40/30* (2013.01); *H04L 41/08* (2013.01); *H04L 41/12* (2013.01); *H04L 43/10* (2013.01); *H04W 4/80* (2018.02); *H04W 84/18* (2013.01)

(58) Field of Classification Search
None
See application file for complete search history.

(56) References Cited

U.S. PATENT DOCUMENTS

| | | |
|---|---|---|
| 2010/0158039 A1 | 6/2010 | Koide et al. |
| 2011/0103299 A1 | 5/2011 | Shuey |
| 2011/0188452 A1 | 8/2011 | Borleske et al. |
| 2011/0188516 A1 | 8/2011 | Borleske et al. |
| 2012/0039218 A1 | 2/2012 | Palchaudhuri et al. |
| 2012/0306284 A1 | 12/2012 | Lee et al. |
| 2015/0049644 A1 | 2/2015 | Lee |
| 2015/0263785 A1 | 9/2015 | Farrokhi et al. |
| 2015/0373618 A1 | 12/2015 | Deenoo et al. |
| 2016/0164726 A1 | 6/2016 | Fraser |
| 2016/0302195 A1 | 10/2016 | Zhang et al. |
| 2016/0345317 A1* | 11/2016 | Levesque .............. H04W 40/12 |
| 2017/0289812 A1 | 10/2017 | Werb |

* cited by examiner

*Primary Examiner* — Ayaz R Sheikh
*Assistant Examiner* — Sori A Aga
(74) *Attorney, Agent, or Firm* — McBee Moore Woodward & Vanik IP, LLC

(57) ABSTRACT

Disclosed is a method of mapping optimal communication routes through a mesh network.

15 Claims, 2 Drawing Sheets

METHOD OF MAPPING OPTIMAL COMMUNICATION ROUTES THROUGH A MESH NETWORK

The current application claims a priority to the U.S. Provisional Patent application Ser. No. 62/361,388 filed on Jul. 12, 2016.

FIELD OF THE INVENTION

The present invention generally relates to the field of Bluetooth Low Energy (BLE) mesh networks. More specifically, the present invention maps efficient and effective communication routes through a mesh network.

BACKGROUND OF THE INVENTION

The present invention expands on the notion of a rebroadcast mesh network developed by Nordic Semiconductors and provides the additional features. A rebroadcasting mesh network functions by flooding all messages to all nodes in the mesh network through broadcasts. Each time that a node receives a broadcast message from some other node in the mesh network, the node repeats the message (i.e. rebroadcasts the message) which lets the surrounding neighbor nodes hear the new message. The neighbor nodes rebroadcast the message to their neighbor nodes, and the process is repeated until all nodes in the mesh network have received the message. This allows wireless devices to talk to each other without being within direct radio range, as devices between them help relaying messages.

In many cases, the mesh network is used primarily for routing between a gateway/coordinator (GW) node (or a root node) that is connected to the external world, and a multitude of other intermediate nodes that are connected to the GW node via the mesh network. In such cases, routing between arbitrary nodes within the mesh network is not required. In such cases, a close to optimal routing algorithm is suggested for the present invention, which relies on minimal information transfer between the nodes, but still provides with optimal or close to optimal routing.

DETAILED DESCRIPTION OF THE INVENTION

Figure 1:
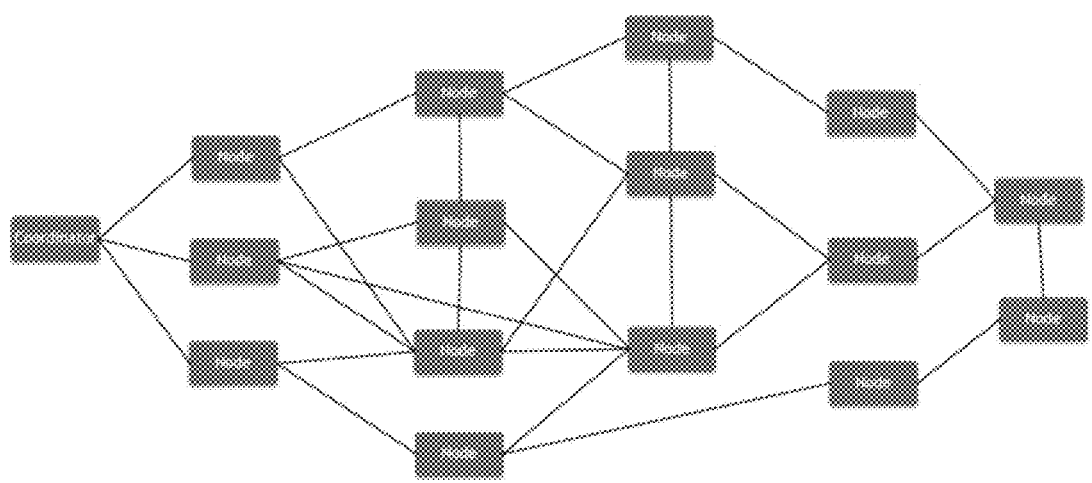
FIG. 1 is a schematic view of all communication routes available in a mesh network.

All illustrations of the drawings are for the purpose of describing selected versions of the present invention and are not intended to limit the scope of the present invention.

The present invention is a method mapping optimal communication routes through a mesh network. The present invention is used to address the need to optimally route information from a root node through a plurality of intermediate nodes and the need to optimally route information back through the plurality of intermediate nodes to the root node. The system used for the present invention includes the root node and the plurality of intermediate nodes, which are able to communicate amongst each other through the mesh network (Step A). The present invention is used to identify and eliminate the suboptimal communication routes that physical exist between nodes in a mesh network. In the context of the present invention, the term "downstream" refers to information travelling from the root node through the plurality of nodes, and the term "upstream" refers to information travelling through the plurality of nodes to the root node.

The method of the present invention follows an overall process in order to identify and use the optimal communication routes to pass information amongst the nodes. The overall process begins by listening for at least one topology-mapping packet with each intermediate node (Step B). A topology-mapping packet is data that reveals the location of a proximal node. A topology-mapping packet includes, but is not limited to, a distance from the root node and the route description. The distance from the root node is the distance measured from the root node to the node that generated the topology-mapping packet. The route description is a record of which nodes have already relayed the topology-mapping packet. The overall process continues by receiving the topology-mapping packet with an arbitrary intermediate node (Step C), which is defined as any node from the plurality of intermediate nodes. The arbitrary intermediate node is then able to assess the information contained within the topology-mapping packet in order to identify an optimal upstream-neighbor node (Step D), which can be either the root node or another intermediate node from the plurality of intermediate nodes. The optimal upstream-neighbor node is a node that is physically near the arbitrary intermediate node and would provide an optimal communication route towards the arbitrary intermediate node. The overall process continues by generating a new topology-mapping packet with the arbitrary intermediate node (Step E). The new topology-mapping packet is catered to account for the arbitrary intermediate node and consequently includes an updated distance from the root node and an updated route description. The arbitrary intermediate node then starts to periodically broadcast the new topology-mapping packet (Step F) so that other intermediate nodes are able to receive and process the new topology-mapping packet. In order to compile a topology of optimal communication routes through the mesh network, Steps C through F are repeated with each intermediate node as the arbitrary intermediate node (Step G). This allows the present invention to selectively forward information packets through the topology of the optimal communication routes (Step F) and consequently provides the present invention with the most efficient and effective way of transferring data amongst the root node and the plurality of intermediate nodes.

The sub-process for identifying the optimal upstream-neighbor node depends on the number of topology-mapping packets that is received by the arbitrary intermediate node. In one scenario, the at least one topology-mapping packet is only a single packet. In other words, the arbitrary intermediate node has only received one topology-mapping packet within the current span of time. In addition, the route description of the single packet discloses the origination node, which is the node that broadcasted the single packet. During Step D in this scenario, the origination node from the single packet is designated as the optimal upstream-neighbor node for the arbitrary intermediate node because the origination node is the only node available to send information to the arbitrary intermediate node. Moreover, the origination node can be the root node, if the distance from the root node disclosed in the single packet is zero. Alternatively, the origination node can be another intermediate node from the plurality of intermediate nodes, if the distance from the root node disclosed in the single packet is greater than zero. During Step E in this scenario, the updated distance from the root node is generated by appending the arbitrary intermediate node into the distance from the root node disclosed in the single packet, and the updated route description is generated by appending the arbitrary intermediate node into the route description disclosed in the single packet. This allows a topology-mapping packet to incremental amass information on an optimal communication path through the mesh network.

In another scenario, the at least one topology-mapping packet is a plurality of topology-mapping packets. In other words, the arbitrary intermediate node has received multiple topology-mapping packets within the current span of time. In addition, the route description of each topology-mapping packet discloses an origination node, which is the node that broadcasted their corresponding topology-mapping packet. During Step D in this scenario, the distance from the root node disclosed in each topology-mapping packet are compared against each other in order to identify a specific packet with the shortest distance from the root node. The specific packet is also identified from the plurality of topology-mapping packets. Also during Step D, the origination node from the specific packet is designated as the optimal upstream-neighbor node for the arbitrary intermediate node because the origination node from the specific packet allows information to travel the shortest communication route from the root node to the arbitrary intermediate node. Similar to the previous scenario, the origination node can be the root node, if the distance from the root node disclosed in the specific packet is zero. Alternatively, the origination node can be another intermediate node from the plurality of intermediate nodes, if the distance from the root node that is disclosed in the specific packet is greater than zero. During Step E in this scenario, the updated distance from the root node is generated by appending the arbitrary intermediate node into the distance from the root node disclosed in the specific packet, and the updated route description is generated by appending the arbitrary intermediate node into the route description disclosed in the specific packet. This allows a topology-mapping packet to incremental amass information on an optimal communication path through the mesh network.

As a variation to the aforementioned scenario, the present invention could identify multiple packets from the plurality of topology-mapping packets as having the shortest distance from the root node. The arbitrary intermediate node measures the signal strength for each of the multiple packets with the shortest distance from the root node. During this variation of Step D, the signal strength for each of the multiple packets are compared against each other in order to identify the specific packet with the strongest signal strength. This is because not only does the origination node from the specific packet allows information to travel the shortest communication route from the root node to the arbitrary intermediate node with the strongest signal strength.

The present invention is able to directly identify the optimal upstream-neighbor node for the arbitrary intermediate node based on the algorithms described above. However, the present invention needs indirectly identify an optimal downstream-neighbor node for the arbitrary intermediate node. Thus, the arbitrary intermediate node is designated as an optimal downstream-neighbor node for the optimal upstream-neighbor node after Step D. In other words, the arbitrary intermediate node cannot proactively designate their own optimal downstream-neighbor node.

The arbitrary intermediate node needs to wait for another intermediate node to designate their optimal downstream-neighbor node for them.

The topology of optimal communication routes within the mesh network established during Step G consists of topology reference tables that has been compiled for each intermediate node. An intermediate node refers to their topology reference table in order to know which node should be the recipient of an upstream message or which node should the recipient of a downstream message. Thus, the topology reference table for each intermediate node needs to refer to a single optimal upstream-neighbor node and to at least one optimal downstream-neighbor node. Typically, the topology reference table refers to a plurality of optimal downstream-neighbor nodes. Once the topology reference table for each intermediate node has been compiled by the present invention, then the information packets in Step F can be serially forwarded through the plurality of intermediate nodes based on the topology reference table.

Alternative Description

Figure 2:
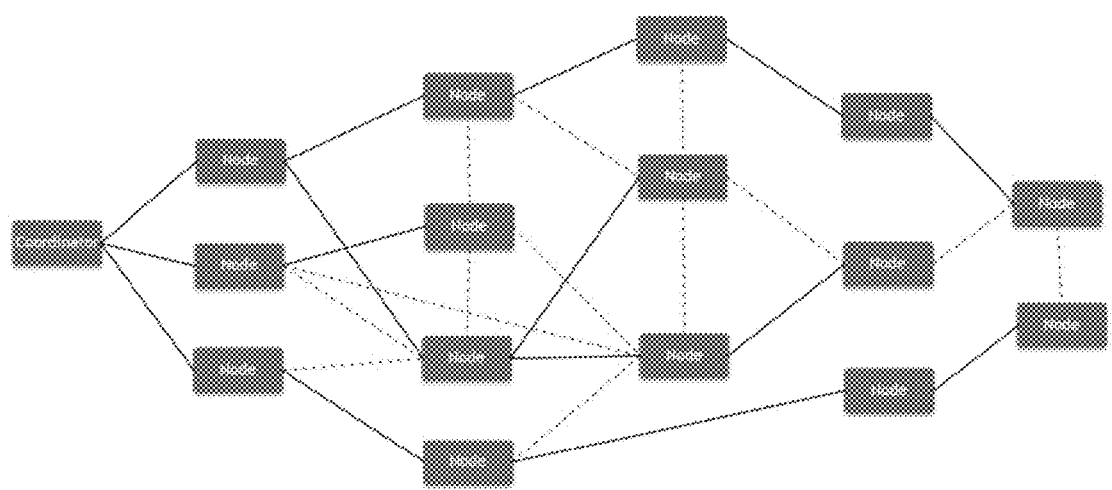
FIG. 2 is a schematic view of the suboptimal communication routes eliminated from the mesh network.

This invention addresses the need of optimally routing between GW->Nodes and between nodes->GW. It does not address the possible need to route information between arbitrary nodes in the mesh. The algorithm described below addressed the existence of suboptimal physical communication paths between nodes by eliminating such paths and passing data only through the most optimal paths. For illustration purposes, FIG. 1 is an example of potential physical network connectivity of a mesh network. In this simplified case of logical connectivity, we can define Upstream direction (node->GW) and downstream direction (GW->node). The purpose of the algorithm is to eliminate multiple/suboptimal paths and to remain with a logical connectivity diagram that resembles an optimal spanning tree. As can be seen in FIG. 2, possibly a subset of paths for example the ones colored red in the following diagram, shall be eliminated, leaving only the black paths for passing data.

Algorithm Description

Following are the basic principles of the algorithm operation:
   Build a spanning tree of the mesh originating from the coordinator
   Each node calculates a routing table based on "local only" computation
   Routing is performed based on flooding along the spanning tree
   The algorithm assumes the following:
   The mesh itself has been built and maintained separately, thus each node has a unique short address that identifies it on the mesh.
   Each node can identify its immediate physical neighbors.
   Each node can capture some measurement that relates to physical proximity of its neighbors. This is usually achieved as a by-product of basic mesh maintenance which usually requires nodes to broadcast something about their existence. Each node would then also listen to such advertisements and capture the RSSI (Receive Signal Strength Indicator) measurements of such broadcast packets received from its neighbors.

The Routing algorithm has slightly different operation at the GW (Coordinator) node and a regular node. It is based on the broadcast transmission of Topology Packets (TP), the reception of such packets, the calculation of a local routing table, and later forwarding packets according to the calculated routing table.

Topology Establishment and Maintenance
  Root (GW) Node Operation:
    1. The root publishes TP: "I am the root", continuously, every "X sec"
      a. X=T sec (nominally 30)
      b. TP contains distance=0
  Normal Node Operation:
    1. Each node listens for Topology messages, and maintains a neighbor table, with aging.
    2. Every "N×X sec" it calculates new best path to root (via node Y)
      a. Route to root, is:
        i. Root itself, if he can hear the root (distance=0)
      b. It must ignore message which claim (routing with next hop=itself)
      c. The node Y which publishes a topology that has the lowest (distance to root D(Y))
        i. In case of tie (the one with the BEST RSSI)
    3. Each node publishes its distance from the root, and the best next hop it found
      a. Publishes every (M×X sec)
      b. Publish TOPOLOGY: "Intermediate node: Route to root is best via Y and the distance is D"
      c. D=Y's published distance+1
Routing Table Buildup
  At the end of the process the node has built up a routing table that contains its upstream next hop neighbor or root and all downstream neighbors which have elected the node itself as upstream next hop. Thus, routing table should have the following type of nodes:
    Root itself if the node hears the root or node with Lower distance (D) to root, which has been elected by the node itself as the upstream next hop (see algorithm as before)
    Nodes with Higher distance (D) to root, which elected the node itself as the upstream next hop (downstream nodes), these are "real downstream neighbors"
  Routing table entries age out pretty fast if No topology messages are received from them.
Forwarding Algorithm
  Each packet which is received by node X, has a destination Z, and the id Y of the intermediate transmitting node:
    Each packet is noted if it is an UPSTREAM packet (originally sent by a node), or a DOWNSTREAM packet (originally transmitted by the root)
    the destination can be anything, but this should be mostly the root in upstream direction, and a node in the downstream direction
  Forwarding Algorithm, Node X:
    If the packet (DOWNSTREAM) and the transmitting node Y is the next upstream of this node X (meaning it is the designated next hop, or root), and the node HAS real downstream neighbors (this is not always the case) then the node must retransmit the packet (flooding along the tree)
    If the packet (UPSTREAM packet) and the node transmitting Y is a downstream node and designated this node X as its own next hop then the packet shall be re-transmitted (retransmit towards the root)
    If the node is the root, and it received the packet (UPSTREAM) not destined to itself, it may need to transmit it downstream (as a DOWNSTREAM packet) again.
      This is a rare case where node->node communication is required. The packet should basically be transmitted once upstream then flooded again downstream along the tree Downstream Forwarding Optimization
  The above forwarding algorithm is optimal in the sense that it will use only spanning tree to forward packets. The above algorithm is optimal upstream, but in the downstream direction it is not as optimal as possible, as packets will need to travers all branches of the spanning tree. To achieve optimization on the downstream direction, such that a packet is not sent on *ALL* the downstream paths, we can optimize further by adding the following behavior
  Each node will essentially build a table of nodes that are downstream of it:
    1. When any packet is received by node X and it should forward it "upstream" it should note that the *real* source of the packet Y was received from neighbor Z, and should enter it into the routing table as a "LEARNED DOWNSTREAM" entry
  The forwarding algorithm is modified to use this information such that downstream packets are ONLY forwarded IFF the destination has been learned as a LEARNED DOWNSTREAM entry. Thus, the packet will traverse through only the most optimal branch of the spanning tree of the mesh. LEARNED DOWNSTREAM entries age out pretty fast if no packets are received from them.

Although the invention has been explained in relation to its preferred embodiment, it is to be understood that many other possible modifications and variations can be made without departing from the spirit and scope of the invention as hereinafter claimed.

What is claimed is:

1. A method of mapping optimal communication routes through a mesh network, the method comprises the steps of:
   (A) providing a root node and a plurality of intermediate nodes, wherein the root node and each intermediate node communicates amongst each other through the mesh network;
   (B) listening for at least one topology-mapping packet with each intermediate node, wherein the topology-mapping packet includes a distance from the root node and a route description;
   (C) receiving the topology-mapping packet with an arbitrary intermediate node, wherein the arbitrary intermediate node is any node from the plurality of intermediate nodes;
   (D) assessing the topology-mapping packet with the arbitrary intermediate node in order to identify an optimal upstream-neighbor node;
   (E) generating a new topology-mapping packet with the arbitrary intermediate node, wherein the new topology-mapping packet includes an updated distance from the root node and an updated route description;
   (F) periodically broadcasting the new topology-mapping packet with the arbitrary intermediate node;
   (G) repeating steps (C) through (F) with each intermediate node as the arbitrary intermediate node in order to establish a topology of optimal communication routes through the mesh network; and
   (H) selectively forwarding information packets through the topology of optimal communication routes.

2. The method of mapping optimal communication routes through a mesh network, the method as claimed in claim 1 comprises the steps of:
   providing the at least one topology-mapping packet as a single packet, wherein the route description of the single packet discloses an origination node; and
   designating the origination node from the single packet as the optimal upstream-neighbor node for the arbitrary intermediate node during step (D).

3. The method of mapping optimal communication routes through a mesh network, the method as claimed in claim 2 comprises the step of:

generating the updated distance from the root node during step (E) by appending the arbitrary intermediate node into the distance from the root node disclosed in the single packet.

4. The method of mapping optimal communication routes through a mesh network, the method as claimed in claim 2 comprises the step of:

generating the updated route description during step (E) by appending the arbitrary intermediate node into the route description disclosed in the single packet.

5. The method of mapping optimal communication routes through a mesh network, the method as claimed in claim 2, wherein the origination node is the root node, if the distance from the root node disclosed in the single packet is zero.

6. The method of mapping optimal communication routes through a mesh network, the method as claimed in claim 2, wherein the origination node is another intermediate node from the plurality of intermediate nodes, if the distance from the root node disclosed in the single packet is greater than zero.

7. The method of mapping optimal communication routes through a mesh network, the method as claimed in claim 1 comprises the steps of:

providing the at least one topology-mapping packet as a plurality of topology-mapping packets, wherein the route description of each topology-mapping packet discloses an origination node;

comparing the distance from the root node disclosed in each topology-mapping packet against each other during step (D) in order to identify a specific packet with a shortest distance from the root node, wherein the specific packet is from the plurality of topology-mapping packets; and designating the origination node from the specific packet as the optimal upstream-neighbor node for the arbitrary intermediate node during step (D).

8. The method of mapping optimal communication routes through a mesh network, the method as claimed in claim 7 comprises the steps of:

identifying multiple data packets each having a multiple data packet distance from the root node equal to the shortest distance from the root node of the specific packet, wherein the multiple packets are from the plurality of topology-mapping packets;

measuring a signal strength for each of the multiple packets with the arbitrary intermediate node; and comparing the signal strength for each of the multiple data packets and the specific packet against each other in order to identify an optimal packet with a strongest signal strength.

9. The method of mapping optimal communication routes through a mesh network, the method as claimed in claim 7 comprises the step of:

generating the updated distance from the root node during step (E) by appending the arbitrary intermediate node into the distance from the root node disclosed in the specific packet.

10. The method of mapping optimal communication routes through a mesh network, the method as claimed in claim 7 comprises the step of:

generating the updated route description during step (E) by appending the arbitrary intermediate node into the route description disclosed in the specific packet.

11. The method of mapping optimal communication routes through a mesh network, the method as claimed in claim 7, wherein the origination node is the root node, if the distance from the root node disclosed in the specific packet is zero.

12. The method of mapping optimal communication routes through a mesh network, the method as claimed in claim 7, wherein the origination node is another intermediate node from the plurality of intermediate nodes, if the distance from the root node disclosed in the specific packet is greater than zero.

13. The method of mapping optimal communication routes through a mesh network, the method as claimed in claim 1 comprises the step of:

designating the arbitrary intermediate node as an optimal downstream-neighbor node for the optimal upstream-neighbor node after step (D), wherein the optimal upstream-neighbor node is either the root node or another intermediate node.

14. The method of mapping optimal communication routes through a mesh network, the method as claimed in claim 1 comprises the step of:

compiling a topology reference table for each intermediate node as the topology of optimal communication routes through the mesh network during step (G), wherein the topology reference table for each intermediate node refers to a single optimal upstream-neighbor node and to at least one optimal downstream-neighbor node.

15. The method of mapping optimal communication routes through a mesh network, the method as claimed in claim 14 comprises the step of:

serially forwarding the information packets through the plurality of intermediate nodes based on the topology reference table.

* * * * *